Feb. 3, 1925.
T. E. BUSCHMANN
TYPEWRITER CALCULATING MACHINE
Filed Sept. 3, 1921
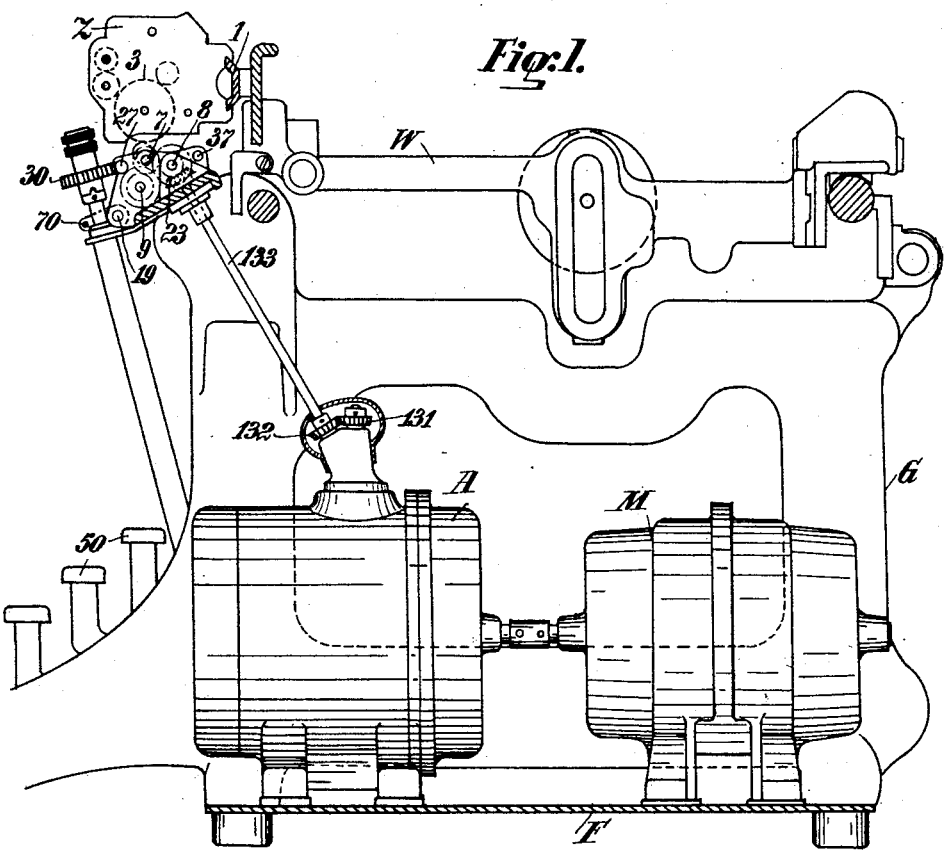
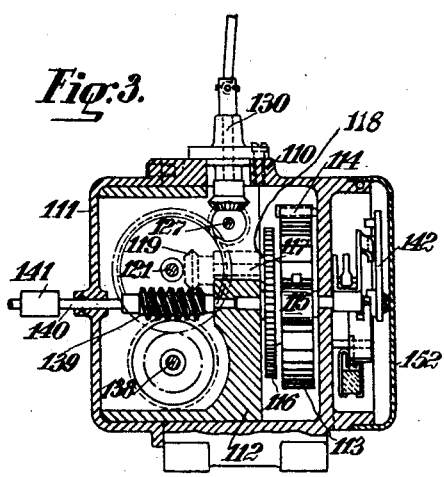
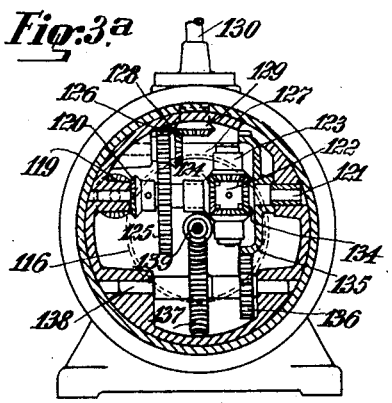

Feb. 3, 1925.
T. E. BUSCHMANN
1,524,729
TYPEWRITER CALCULATING MACHINE
Filed Sept. 3, 1921   7 Sheets-Sheet 2
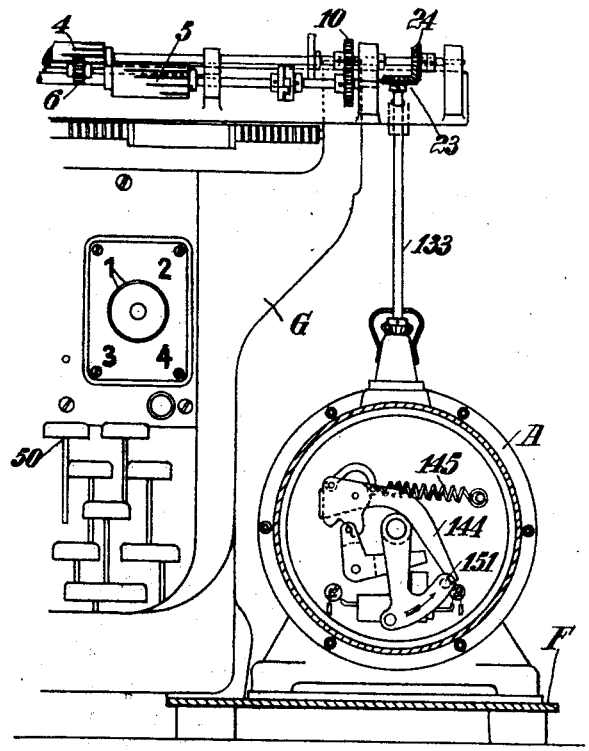
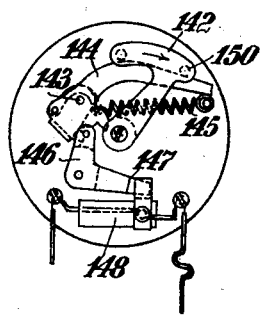
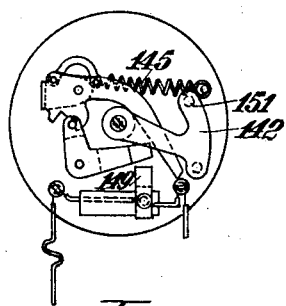

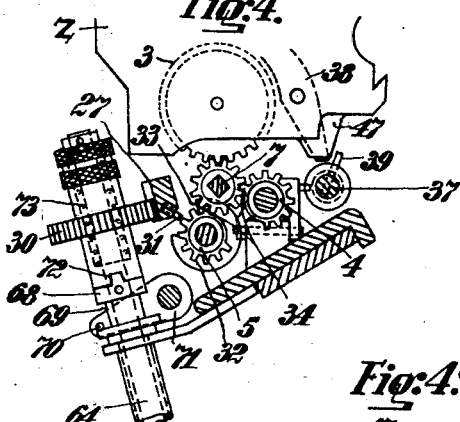
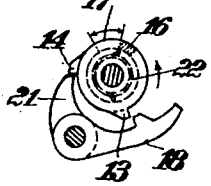
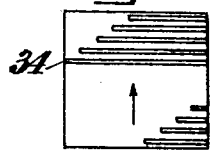
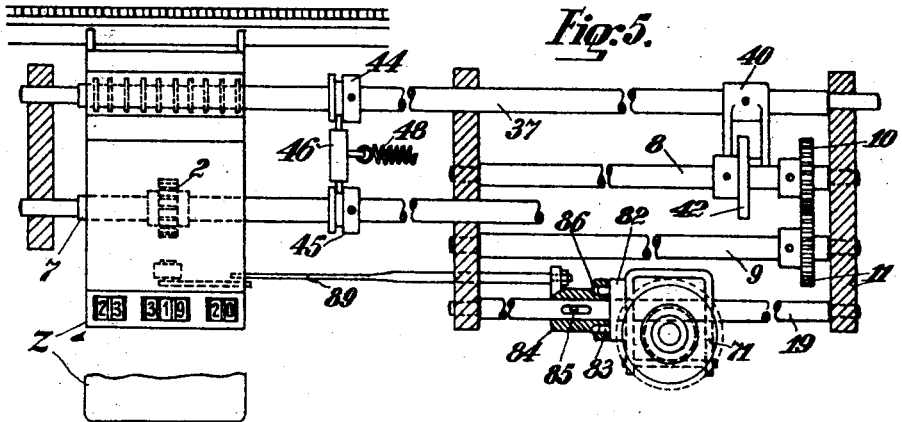

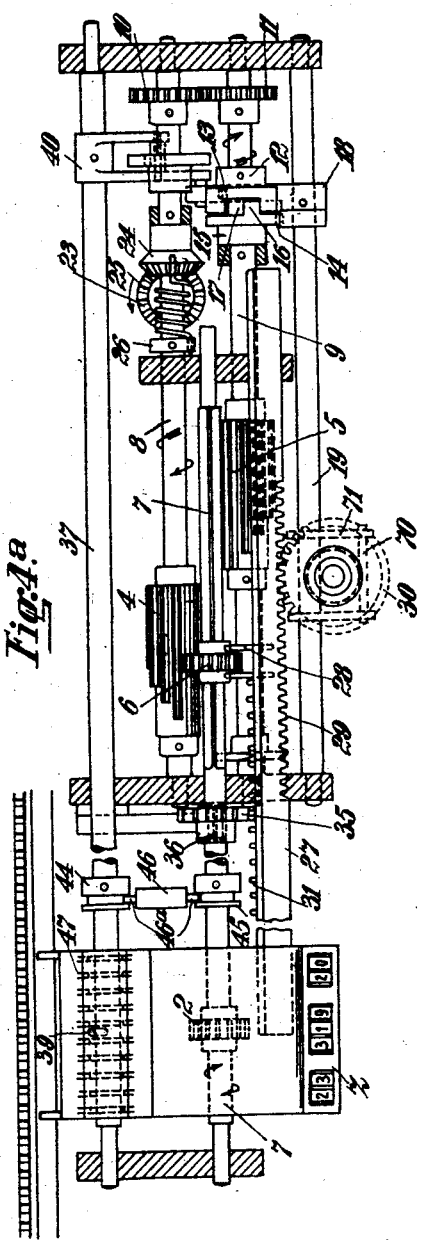

Feb. 3, 1925.
T. E. BUSCHMANN
1,524,729
TYPEWRITER CALCULATING MACHINE
Filed Sept. 3, 1921
7 Sheets-Sheet 5
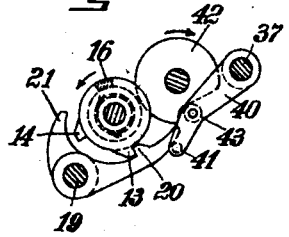
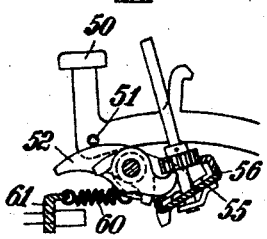
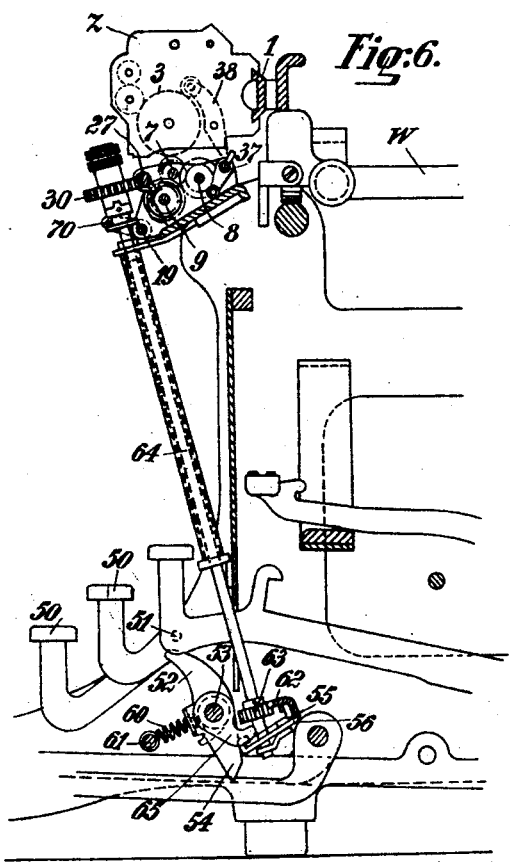
Inventor
T. E. Buschmann,
By Marks&Clerk
Attys.

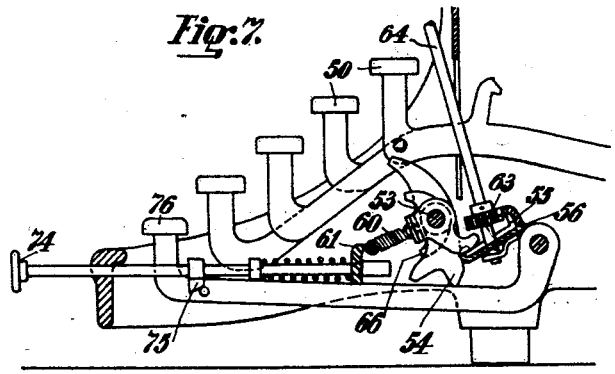
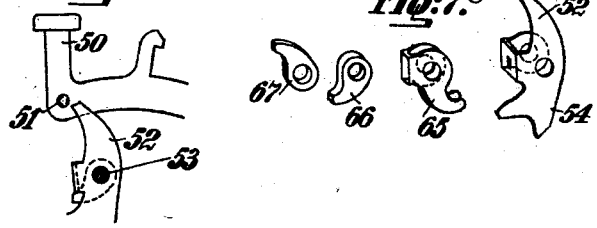
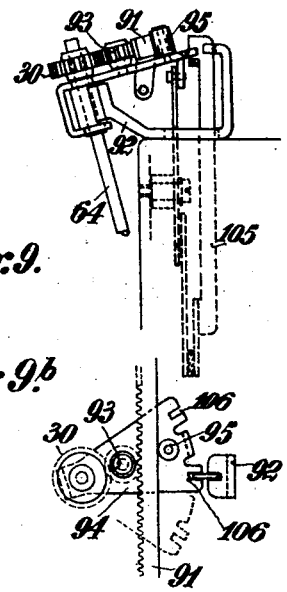
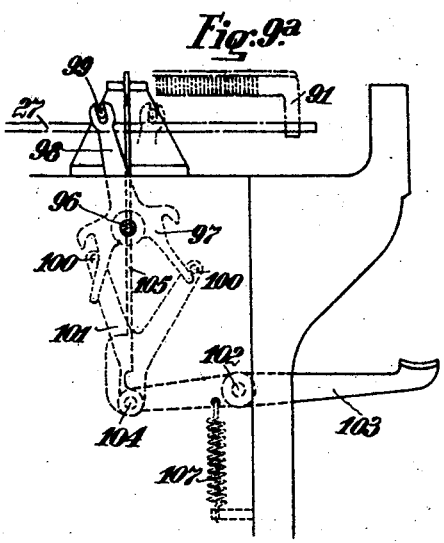

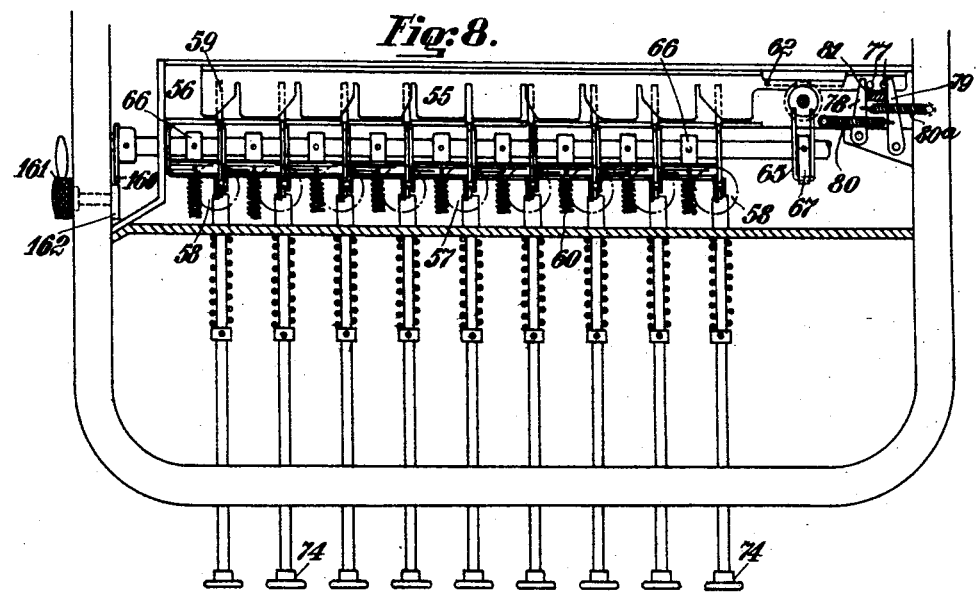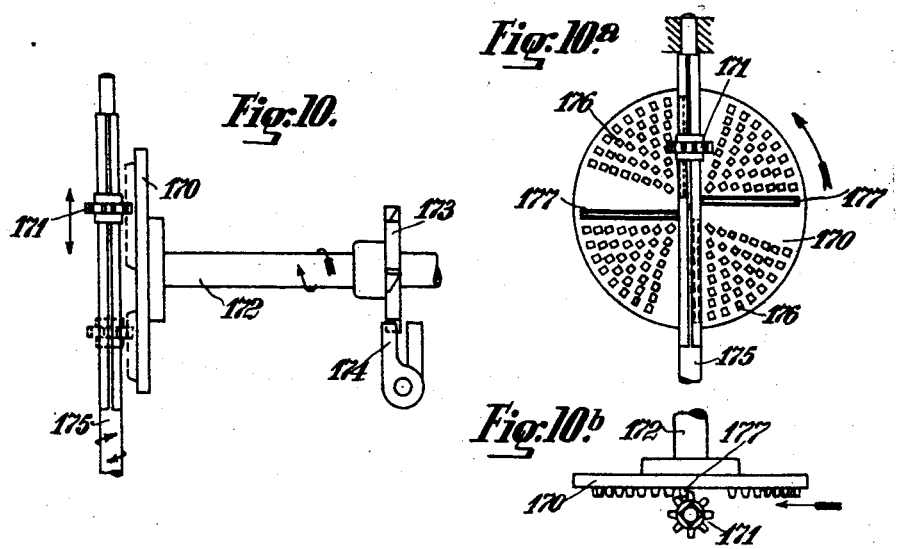

Patented Feb. 3, 1925.

1,524,729

UNITED STATES PATENT OFFICE.

THEODOR EUGEN BUSCHMANN, OF CHEMNITZ, GERMANY, ASSIGNOR TO THE FIRM OF WANDERER WERKE VORM. WINKLHOFER & JAENICKE AKT. GES., OF SCHOENAU, NEAR CHEMNITZ, GERMANY.

TYPEWRITER CALCULATING MACHINE.

Application filed September 3, 1921. Serial No. 498,489.

*To all whom it may concern:*

Be it known that I, THEODOR EUGEN BUSCHMANN, a citizen of the Republic of Germany, and a resident of Chemnitz-Kappel, Germany, have invented certain new and useful Improvements in and Relating to Typewriter Calculating Machines, of which the following is a specification.

The subject of the invention is a so-called typewriter calculating machine, that is to say a typewriter combined with one or more calculating devices. As a rule in machines of this kind separate counting mechanisms are fixed on the typewriter carriage for column addition, being mounted on a bar of the typewriter carriage and displaced therewith, and during the movement from column to column, the driving wheel for the calculating or counting mechanism passes into operative connection with the digit wheels belonging to the separate columns of the counting mechanism.

Typewriters with counting mechanisms mounted thereon have already been proposed but these prior arrangements have either the drawback of being highly complicated or in the case of the simpler construction reliable operation could not be depended upon. There was in particular no absolute certainty that overrunning of the digit wheels of the counting mechanism would be prevented.

According to the present invention in order to avoid these drawbacks a new way is adopted for transmitting the value on the key to the counting mechanism. For this purpose the numerical value of the depressed key is transferred to the calculating or counting mechanism in such a manner that a transmission member which is adapted to be displaced by depressing the key is in operative communication with a digit selecting member, this digit selecting member carrying out a predetermined and limited movement for each transmission and being provided with a number of steps, stops or the like which embody the numbers 1 to 9.

The transmission member which is adapted to be displaced by pressure on the key must in this connection preferably be so constructed to co-act with the digit selecting member in such a manner that the latter in its effort to carry out the predetermined and limited movement imparts to the transmission member a setting corresponding to that of the numerical value of the depressed key, the said setting being again transmitted to the driving member for the counting mechanism.

The arrangement according to the invention, moreover, enables the operation of addition or subtraction to be carried out without difficulty because the digit selecting member is either provided in duplicate with different directions of movement or may be constructed in such a manner that the transmission member for the time being will be given another direction of movement or another sense of rotation.

A constructional form of the subject of the invention is illustrated by way of example in the accompanying drawings, which show:—

Figure 1 a side elevation of a typewriter calculating machine with the typewriter-frame G, the typewriter roller carriage W, the counting mechanism Z, the driving gear A for the mechanism for setting and transmitting the numerical value of the depressed key, the electro-motor M and the base plate F for the driving gear and motor;

Figure 2 a partial front elevation of the typewriter calculating machine;

Figure 3 a longitudinal section through the driving gear A;

Figure 3ª a cross-section through the same;

Figure 3ᵇ a diagrammatic view of the automatic electric switch mechanism for the driving gear A when the circuit is closed;

Figure 3ᶜ a corresponding view when the circuit is open;

Figure 4 an enlarged side elevation of the transmission mechanism;

Figure 4ª a view from above according to Figure 4;

Figure 4ᵇ the controlling mechanism for the digit selecting member in the position of rest;

Figure 4ᶜ the same controlling mechanism during the controlling operation;

Figure 4ᵈ is a plan view of the developed surface of one of the digit selecting members.

Figure 5 an enlarged plan view of a clutching device between the digit selection controlling mechanism and the counting mechanism;

Figure 5ª a partial view from above of Figure 5;

Figure 6 a cross-section through the front portion of the typewriter calculating machine;

Figure 7 a cross-section through the key mechanism and the setting mechanism viewed from the side;

Figure 7ª is a separate view of the setting member with a finger key in action;

Figure 7ᵇ a corresponding view in the position of rest;

Figure 7ᶜ separate views of the setting members and cams;

Figure 8 a plan of the key and setting mechanisms;

Figure 9 a side view of a modified construction of the device for changing over from addition to subtraction;

Figure 9ª a frant elevation of Figure 9;

Figure 9ᵇ the corresponding plan;

Figure 10 another constructional form of the digit selecting member in co-operation with the transmission member viewed from the side;

Figure 10ª the same device viewed from the front;

Figure 10ᵇ a corresponding view from above.

For the purpose of explaining the subject of the invention and its mode of operation, there is employed a digit selecting member preferably in the form of a stepped-roller, that is to say, a roller with stepped teeth, the steps or lengths of which correspond to the series of numbers 1 to 9. These stepped-roller teeth are in engagement with the transmission member preferably in the form of a setting wheel or pinion, so that the latter, according to its longitudinal displacement relatively to the stepped roller will be rotated one or more units when the stepped roller carries out its predetermined and limited movement, that is to say, in the present case one revolution.

The setting wheel is slid by the figure keys along the stepped roller to a position corresponding to the value of the key, so that during the rotation of the stepped roller only the definite number of teeth which has at the moment been selected in this manner will be transmitted to the setting wheel.

For carrying out addition and subtraction the arrangement when using stepped-rollers is preferably such that two stepped-rollers are provided which are connected together by means of a gearing and rotate in opposite directions. According to the calculating operation which is to be effected, the setting wheel or pinion is either brought into operative connection with the stepped-roller which rotates to the left or with that which rotates to the right.

In order to permit always only a single and exactly limited rotation of the stepped-roller, a braking device is preferably provided which selects the point at which the stepped-roller is arrested in such a manner that the last and longest number tooth on this stepped-roller will still remain in engagement with the setting wheel. This arrangement has the considerable advantage that the transmission member (setting wheel or pinion) always remains in engagement with the stepped-roller and is thus securely arrested when the stepped-roller has ceased to rotate, so that overrunning and thereby incorrect further transmission of the numerical value of the depressed key to the counting mechanism will be entirely prevented.

The setting wheel is slid by pressure on one of the figure keys by means of a rack bar an amount corresponding to the numerical value of the figure key and is held secure by means of a securing device in the selected position until the stepped-roller has completed its rotation; only then is the setting wheel again free for a new setting.

The rotation of the stepped-rollers is effected by means of a driving mechanism which can be constructed according to requirements. The stepped-rollers can, for instance, be driven directly by the keys or also by means of a separate motor, a loaded spring, a weight or the like can however be arranged to act as a power storage means.

The energy which has been expended can be restored during the return of the typewriter carriage. It can also be restored however by means of a separate hand lever or a pedal.

In the constructional example illustrated, a loaded flat spring is provided to act as a power storage means, the load of which is restored automatically by means of an electro-motor which is connected up when the load on the spring has been reduced by a certain amount and which is automatically disconnected again when the spring has been wound up.

In order, during the operation of the paper carriage of the typewriter, to enable the counting mechanism mounted upon the typewriter carriage to take part in the movement of the typewriter carriage, even during the transmission of the numerical value of the depressed key without interrupting the engagement between the driving member and counting mechanism, the driving member with the counting mechanism is coupled therewith in such a manner that it permits a lateral displacement approximating to the width of a column and can in this manner follow the counting mechanism until the calculating operation has been completed, whereupon the driving member with the digit wheels of the counting mechanism are released and they spring back again automatically to their original positions.

On a bar 1 which runs the full length of the typewriter roller carriage W of a known construction are adjustably mounted one or more calculating or counting mechanisms Z (Figure 1). The separate digit wheels 3 of the counting mechanism Z come into engagement one after the other with the driving pinion 2 for the calculating or counting mechanism Z, the driving pinion 2 being preferably arranged approximately in the middle of the typewriter opposite the type printing position.

The driving pinion 2 is only made of such width that at any time only a single digit wheel 3 of a column in the counting mechanism will be driven.

By means of the stepped rollers 4 and 5 the driving wheel 2 will be rotated by the amount of one or more teeth according to the numerical value to be transmitted, namely through the medium of a transmitting member which is adapted to be slid in the longitudinal direction of the stepped-rollers, to the second wheel 6.

The stepped-rollers 4 and 5 have 9 teeth of different lengths which are stepped to correspond to the numerical values 1 to 9 (Figure 4$^d$).

The above-mentioned setting wheel 6 (Figure 4$^a$) co-acts with the stepped rollers 4 and 5, the said setting wheel being axially displaceable on the shaft 7 of the driving wheel 2 but not capable of rotation. This setting wheel 6 can be set with respect to the stepped-rollers in such a manner that during one rotation of the stepped-roller it can be moved by an amount of from 1 to 9 teeth. The setting wheel 6 can be brought into engagement with either of the stepped-rollers 4 or 5 according to whether addition or subtraction is to be effected. In the constructional example shown the stepped-roller 4 is driven in the direction of rotation for addition and the stepped-roller 5 in the direction of rotation for subtraction. For controlling the direction of rotation the shafts 8 and 9 of the stepped-rollers 4 and 5 are in operative connection with each other by means of the gears 10 and 11.

The stepped-roller shafts 8 and 9 are driven simultaneously by controlled actuating mechanism, a constructional form of which will be described hereinafter, and tend to rotate continuously but are however generally held locked in an initial position, namely in such a manner that the stepped rollers 4 or 5 each time the calculating operation is to take place in a column, can carry out a predetermined movement, that is to say in the present case an exactly limited rotation.

The mechanism which is employed for this purpose (see more particulary Figures 4$^a$, 4$^b$ and 4$^c$) consists of an escapement disc 12 which is rigidly mounted upon the shaft 9 and has an escapement tooth 13. A second escapement disc 15 is mounted so as to be free to rotate on the shaft 9 and is acted upon by a torsion spring, the said escapement disc having an escapement tooth 14 capable of rotating through a small angle, and with a driving dog 16 in the recess 17 of the fast escapement disc 12.

A controlling member 18 constructed in the form of a balance arm co-acts with the escapement teeth 13, 14 respectively, the said controlling member being fixed upon a shaft 19 which, as will be hereinafter more particularly described, is acted upon by the figure keys of the typewriter. In Figure 4$^b$, the controlling member 18 is in the inoperative position, the tooth 13 of the escapement disc 12 rests against the pallet 20 of the balance arm (the other pallet 21 of the balance arm is clear of the teeth of the escapement wheel and the torsion spring 22 (Figure 4$^c$) which is situated inside between the escapement discs has rotated the loose disc 15 with its escapement teeth 14 until the driving dog 16 of the loose disc 15 rests up against one end of the recess 17 of the escapement disc 12, (Figure 4$^b$).

In view of the controlling member shown in Figure 4$^c$, the balance arm 18 has been caused by pressure on the figure keys to be swung out to the other side. By this means the pallet 20 has released the tooth 13 of the fixed escapement disc 12 and the two shafts 8 and 9 respectively with the stepped rollers 4, 5 respectively are able to carry out their rotation. This rotary movement is limited by the escapement tooth 14 of the resiliently mounted disc 15 which comes into contact with the other end of the recess 17 against the action of the torsion spring 22. The shaft 8 of the stepped roller 4 is driven by a pair of intermeshing bevelled wheels 23, 24 the former being connected to a common source of power, which coacts with the intermeshing gears 10 and 11 and, tends to rotate the stepped rollers 4 and 5 continuously. The bevelled wheel 24 is mounted loose on the shaft 8 and is connected therewith through the medium of a helical spring 25 and the collar 26. The object of this elastic connection between the shaft 8 and the bevelled wheel 24 is to store up power on the one hand, and on the other hand to eliminate the inertia of the driving parts.

The second wheel 6 which is arranged so as to be capable of displacement in the axial direction of the stepped rollers, is slid by the levers of the figure keys into a definite position with respect to the stepped roller, in accordance with the numerical value of the figure key, namely through the medium of a setting bar 27 (Figure 4ª) which is adapted to engage the second wheel 6 by means of two driving pins 28, in such a manner that the movements of the setting bar 27 will be transferred to the setting wheel 6. The said setting bar 27 is provided over a portion of its length with teeth 29 which have an engagement with a gear wheel 30. This gear wheel 30 receives rotary movements and displacements from the keys; the manner in which this takes place will be further described hereinafter. A number of locking pins 31 are in addition mounted on the setting bar 27, being spaced uniformly with respect to each other like the teeth on the rollers 4 and 5 so that the spaces between the pins will correspond with the numerical value setting of the setting wheel 6 for the time being. A disc 32 co-acts with the locking pins 31, the said disc having a gap 33 (Figure 4). This disc 32 is set on the shaft 9 with its gap 33 in such a manner that it allows a displacement of the setting bar 27 only when the stepped rollers 4 or 5 are not rotating. If, however, the stepped rollers are rotating, then the setting pinion 6 is locked in a position in which it has been for the moment set by the figure keys, because the solid portion of the locking disc 32 passes between the locking pins 31 of the setting bar 27 during this time.

The point at which the stepped rollers 4 and 5 are arrested is so chosen that the lowest lying stepped roller tooth 34 (Figure 4ᵈ) will always remain in engagement with the setting pinion 6. By this means an undesired continued movement of the setting wheel or the so-called over-running thereof will be entirely prevented, while on the other hand, when the rotation of the stepped-rollers for the purpose of setting the numerical value commences, this rotation immediately takes place. Moreover, in order to prevent the setting pinion 6 from being accidentally rotated, a star wheel 35 is mounted on the shaft 7, a locking roller 37 being resiliently pressed into the gaps between the teeth of the setting star wheel.

When the numerical value of the depressed key is transmitted over the stepped-rollers 4 or 5, and the setting pinion 6 to the driving wheel 2 over the setting wheels 3 of the counting mechanism, then a device must be provided which will enable separation of the columns to be effected such for instance, as shown in U. S. patent 1,349,-246; this is necessary because the tens controlling devices which are situated to the right of the driving wheel 2 and the members of the calculating mechanism appertaining thereto must be disconnected in order that a carrying over of the tens to the wrong side will not take place. For this purpose the lever 38 in the counting mechanism Z on which the tens controlling mechanism is situated is raised and shifted into the inoperative position through the medium of a pin 39 which is fixed on a release shaft 37 and which can come into contact with the release lever 38 during the oscillation of the shaft 37 (Figure 4). The release shaft 37 is put into operation by means of the forked shaft lever 40 which is connected to the escapement 18, 21 in such a manner that it will be swung out towards the right (Figure 4ᵇ) as soon as the rotation of the stepped-roller begins, because the balance arm 18 presses against the pin 41 of the lever 40. In order to swing out the lever 40, a cam disc 42 is arranged on the stepped-roller shaft 8, the said cam disc co-operating with the roller 43 of the release shaft lever 40 and maintaining it in the release position until the stepped-roller has completed its rotation.

In the arrangement shown, the pallet 18 of the balance arm 18, 21 which acts against the pin 41 facilitates the action of the cam disc at the commencement of the outward swing and thereby the release of the lever 38, whereby a considerable amount of power is required, while later the cam disc 42 holds the lever 40 in its released position and controls its inward and outward swing.

As the typewriter carriage, as is well known, is forced forward when writing a character, by the amount of a letter space or the width of a column, the counting mechanism will also be moved forward during this movement. If in doing so the movement of the typewriter carriage takes place too early, then it may happen that the calculating operation will not have been completed and that the driving pinion 2 will come out of engagement with the setting wheel 3 with which it is for the moment in engagement, and will be slid into engagement with the next setting wheel of the counting mechanism Z. In order to prevent this, the release shaft 37, as well as the shaft 7 of the driving pinion 2, are journalled so as to be capable of sliding axially by the amount of a letter space or width of a column. Both shafts 37 and 7 are coupled to one another by means of collars 44 and 45 respectively through the medium of a coupling fork 46 which is capable of moving to and fro in the direction of the shafts 7 and 37, and which is provided with tongues 46ª which engage in annular grooves in the collars 44 and 45 so that they can be slid exactly parallel. By means of this arrangement the shaft 7 with the driving pinion 2 is dependent for its movement on the release shaft 37.

Compartments are formed in the lower portion of the casing of the counting mechanisms Z on the rearward side thereof by means of separate partitions 47, (Figures 4 and 4ᵃ), in which compartments the release pin 39 which sets the release lever 38 of the counting mechanism in operation, is introduced. Accordingly as long as the pin 39 is situated in its release position between the partitions 47 of one of the said compartments, the shaft 37 is also coupled to the counting mechanism Z, so that during a displacement of the typewriter carriage, it can make a certain movement with it in the axial direction, that is to say, if the typewriter carriage moves forward during the time in which the setting of the counting mechanism corresponding to the numerical value of the depressed key takes place, then the partition walls 47 provided with the release shaft 37 and, through the medium of the coupling device 44, 45, 46, 46ᵃ, the shaft 7 and the driving pinion 2 will also move with the setting wheel 3 of the counting mechanism Z by this amount until the calculating operation is completed and the release pin 39 is once more out of the control of the partition wall 47. The two shafts 7, 37, which are coupled to one another will then be moved back to their initial position by means of a spring 48 (Figure 5).

As previously mentioned, the setting pinion 6 must be brought to correspond to the numerical value of the key which is to be depressed according to the calculation, into the position with respect to the stepped-rollers in which during the rotation of the stepped-rollers 4 and 5, the setting wheel 6 is rotated, to such an extent as is necessary according to the value of the key. For this purpose, movements of the keys are transmitted to a rack bar 55 which is thereby moved laterally and by this movement causes the rotation of the setting collar which is transferred to the setting bar 27. In the arrangement illustrated (Figures 7 and 8) the figure key levers 50 act by aid of a pin 51 on the intermediate lever 52 which is pivoted on the shaft 53 so as to be able to rotate separately.

A downwardly directed projection 54 of the intermediate lever 52 sweeps into the control of the rack bar 55, which is slidably mounted in a guiding frame 56. A rack bar 55 is provided at the point of entry of the intermediate lever 52 with gaps having inclinations of different widths along which the intermediate lever sweeps and thereby displaces a rack bar laterally. It is preferable to construct the apparatus in such a manner that the rack bar 55 will not be displaced laterally when the middle key 57 (with the numerical value 5) is struck. In the case of keys 58 (with the numerical values 1 and 9) which are situated farthest apart, the greatest movements must take place from the centre to one of the two sides. In order that the intermediate levers 52, 54, will be kept in their position against lateral movements, slots 59 are formed in the guide frame 56, in which slots the lower projections of the intermediate levers engage. The intermediate levers 52, 54, are drawn back into the inoperative position by means of springs 60 which are suspended from a bar 61 which passes right across the machine (Figure 7ᵃ). As will be seen in Figure 7ᶜ, the intermediate levers 52, 54, are arched or bridge-shaped at their bearing portions. A part 62 which is in the form of a toothed rack is formed on the rack bar 55, with which rack a gear wheel 63 engages which is mounted on the setting shaft 64. The rotations of this setting shaft are transferred by means of a toothed wheel 30 and the setting bar 37 to the setting wheel 6.

As the rack bar must carry out a movement which is as small as possible, it is situated normally, as already mentioned, in a central position in which it is returned automatically by means of springs after a lateral displacement, namely, in the manner presently to be described. The rack bar 55 is provided with two pins 77 with which the two levers 78 and 79 engage and which are acted upon by springs 80, 80ᵃ respectively. The stroke of the levers 78 and 79 is determined by means of a stop member 81. As soon as a lateral displacement of the rack bar 55 takes place, either the lever 78 is put under load by means of its spring 80ᵃ or the lever 79 is put under load by means of its spring 80, and the rack bar 55 is brought back into its central position when it is released again at the conclusion of the said operation.

The setting shaft 64 above mentioned is used, moreover, for the purpose of setting in action the mechanism for controlling the rotations of the stepped-rollers 4 and 5. The shaft 53 on which the intermediate levers 52, 54, are mounted, carries a controlling lever 65 which is fixed to it, and which engages under the gear wheel 63 over the rack bar 55.

The lower edge of the bridge of the intermediate levers 52, 54, which are mounted upon the shaft 53 so as to be free to rotate when the rack bar 55 is to be laterally displaced, strikes against the dogs 66 which are rigidly mounted upon the shaft 53 of the intermediate lever and rotated, whereby the controlling lever 65 will be swung out by the cams 67 which are rigidly mounted upon the shaft 52 of the intermediate lever and thereby passes below the gear wheel 63 and raises it together with the setting shaft 64. A collar 68 is fixed at the upper end of the setting shaft 64 and is provided with a guide groove 69, in which the pin 70 of the lever 71 which is rigidly mounted upon the shaft 19, engages. The shaft 19, however, carries the balance arm 18, 21, so that by lifting the setting shaft 64 and rotating the controlling shaft 19 the controlling mechanism (Figures 4, 4b, 4c) for the stepped-rollers will be set in operation as previously described.

If the machine is not to be used for calculating purposes, then as shown in Figure 7b, the apparatus for transferring the numerical value of the depressed key can be disconnected, namely, by moving the shaft 53 of the intermediate levers 52, 54, into a position in which the intermediate lever will be swung out until its pin 51 will no longer be able to cause the figure key levers 50 to act upon the intermediate lever, but will sweep past the same. In order to effect this, the shaft 53 is provided with a lever 160 (Figure 8) which by aid of a cam 162 is adapted to be moved by the lever 161, and is acted upon in such a manner that the shaft 53 will, when the lever 161 is turned over, by means of its cams 66 bring the intermediate members 52, 54, out of the control of the type lever driving pin 51 into the inoperative position shown in Figure 7b.

It is preferable to set in operation the mechanism for transferring the numerical value of the depressed key to the counting mechanism only when the counting mechanism Z passes within the control of the driving pinion 2. This can be made to take place in various ways. It will be possible for instance to allow the shaft 53 to be set by the motion of the counting mechanism in such a manner that the intermediate members 52, 54, receive the setting according to Figure 7b, when the counting mechanisms are beyond the control of the driving pinion 2, while at the moment when the counting mechanism Z comes into engagement with the driving pinion 2, or shortly before this, the shaft 53 will be set into the position shown in Figures 7 and 7a, in which the pin 51 of the key lever can act upon the intermediate members 52, 54.

In Figures 5 and 5a a form of construction of the connecting and disconnecting of the transmission mechanisms between the figure key levers and counting mechanism is illustrated. The controlling mechanism repeatedly referred to above, which regulates or controls the rotation of the stepped-rollers 4 and 5, is for this purpose releasably connected by a coupling to the shaft 19, as long as no counting mechanism is in operative connection with the driving pinion 2 or seeks to be so, whereby the controlling mechanism is kept inoperative and the stepped-rollers 4 and 5 can thus not come into operation. For this purpose the stirrup-shaped controlling lever 71, which is mounted on the shaft 19 and, as described above, is turned by the vertical shaft 64 being raised for releasing the controlling mechanism of the stepped-rollers, is provided on its left side (Figure 5) with a hub 82, which is fitted with two pins 83. On the shaft 19 there is mounted a slidable sleeve 84, which is operatively connected to the shaft by the driving pin 85, which extends through a corresponding slot in the shaft 19, so that the coupling sleeve 84 can be slid laterally, but must take part in the rotary motion of the shaft 19. On that side of the coupling sleeve 84 which faces the hub 82 there are two holes 86, in which the pins 83 of the control lever hub 82 can engage. This engagement or interconnection of the coupling sleeve 84 with the hub 82 of the stirrup shaped lever 71 is effected through the movement of the counting mechanism Z. A bell crank lever 88, which is pivoted at 87 (Figure 5a), displaces, by means of a connecting rod 89 attached to it, the coupling sleeve 84 also connected with it, into the coupling position, when the counting mechanism Z runs on to the roller 90 of the bell crank lever 88. In this position the shaft 19 is swung away by means of the stirrup shaped lever 71 and releases the controlling mechanism for the stepped rollers 4 and 5. On the counting mechanism passing again out of reach of the driving pinion 2, the roller 90 of the bell crank lever 88 is released from the pressure of the counting mechanism and a spring, which is not shown, causes the coupling members 82 83, 84, 86 to disengage again, so that the controlling mechanism for the shafts of the stepped rollers is no longer put in operation.

It has been stated above that one of the stepped rollers is intended for addition and the other for subtraction. Which kind of calculation is transmitted to the counting mechanisms in each case thus depends entirely on which stepped roller co-acts with the setting pinion 6. Hence, for changing from addition to subtraction the setting pinion 6 must preferably be displaced, that is, it must be brought from its middle position (corresponding to the numerical value 5) in front of one of the stepped rollers into the corresponding middle position in front of the other roller. For this purpose the pinion 30, which meshes with the setting bar 27 (Figures 4, 4a) is operatively connected to the setting shaft 64 by a sort of claw coupling 68, 72. The pinion 30, with its sleeve-like hub, is upwardly displaceable in the longitudinal direction of the shaft 64 in opposition to a spring 73 fitted within the said sleeve. By means of this arrangement the pinion 30 can be somewhat raised, be thus brought out of engagement with the teeth 72 and can then be turned by hand as required, whereupon it can be lowered again in a different position with its sleeve so as to couple with the teeth 72. During this rotation of the pinion 30 the setting pinion 6 is displaced from one middle position into the other in front of the stepped rollers 4 and 5.

In Figures 9, 9ᵃ and 9ᵇ a special arrangement is shown, by means of which, by pressing on one and the same key, the setting pinion 6 can be changed over from addition to subtraction and vice versa. According to this arrangement the setting bar 27 is fitted with a special rack 91, which, when moved laterally, takes the setting bar 27 and the setting pinion 6 along with it. The rack 91 is driven by the shaft 64, which is itself rotated by the rack bar 55 and is rotatably journalled in a support 92 and acts, with the pinion 30, through an intermediate gear 93, on the rack 91 displacing the latter. This intermediate gear 93 is mounted on a segment 94, which is rotatable about the shaft 64 as its axis, so that, on the segment 94 forming a swinging movement, the intermediate gear 93 will planet around the pinion 30 and will thereby displace the rack 91 and by means of the rack 91 the setting pinion 6 from one stepped roller to the other. In order that the intermediate gear 93 shall remain permanently in mesh with the rack 91 and that the latter may not be pushed away a counter roller 95 is provided, which slides at the back of the rack. The segment 94 is swung by means of a driver 97, which is pivoted at 96 and by means of a lever 98 engages a pin 99 on the segment 94. The driver 97 is operated by two pins 100 which are mounted on the arms of a fork shaped lever 101, and is connected by a pin 104 to a key 103 pivoted at 102. To the pin 104 there is also attached a rod 105, the upper end of which is guided in a slot of the support 92 and engages in slots 106 (Figure 9ᵇ) of the segment 94, whereby it secures the said segment in any position. The key 103 is automatically brought back to its original position by a spring 107 and is normally held there. From Figure 9ᵇ it is obvious how the segment 94 is secured in its two positions through the action of its slots 106 and the rod 105 (for addition and subtraction), while Figure 9ᵃ shows how, through the action of the pins 100 of the two forked arms mounted at the lower end of the driver 97, the said arms displace the driver about its pivot 96 to one side or the other, when the key 103 is depressed.

In some cases it is preferable to carry out a calculation without striking the figure keys and the figures being printed. For this purpose a special key extension 74 (Figures 7 and 8) is preferably provided, the separate keys of which act directly on the intermediate levers 52, 54 and initiate the calculating process. In order to effect the operation of the paper carriage, which is necessary for maintaining the distances between the separate columns in this case as well, the keys 74 are fitted with dogs 75, the lower surfaces of which are bevelled and act on a stop bar on the intermediate space key and put the same in operation, by which means the paper carriage is operated in the usual manner.

It has been stated above that the shafts 8 and 9 of the stepped rollers 4 and 5 are subject to the action of a power storage means, which tends to rotate the stepped rollers continuously, and the constructional form shall in the following be described, in which a stressed flat spring is used, the stressing of which is automatically supplemented after a certain expenditure of energy by the putting in operation of the electric winding motor. The entire driving mechanism for the stressing spring, including the spring itself, is preferably enclosed in a casing so as to protect all the parts from any external action and dust and also so that the working parts may run in an oil bath. It may be further stated that with such an arrangement it is possible without difficulty to mount the entire driving mechanism including the winding motor in a tubular casing so that it will form a complete aggregate, which can readily be fixed by means of clamps or similar simple means to any typewriter of ordinary construction.

The operative casing 110 (Figures 3 and 3ᵃ) is preferably made in two parts, fitted with a casing cover 111 and contains within it a bearing frame 112 for the various driving shafts. The outer convolution of the ribbon spring 113, which acts as the power storage means, is attached to a pin 114, while the inner convolution is attached by means of a pin or similar means to the spring spindle 115. On this spindle is fixed a wheel 116, which meshes with a pinion 118 mounted on an intermediate spindle 117. A pair of bevel wheels 119, 120 drive a differential gear shaft 121, on which the cross-piece 122 of the said differential gear is fixed with the two planet wheels 123. To the differential wheel 124 there is fixed a spur wheel 125, which drives a pinion 126 on the transverse shaft 127. On this transverse shaft 127 there is further mounted a bevel wheel 128, which meshes with another bevel wheel 129 and thereby drives the upright shaft 130. Outside the casing 110 a bevel wheel 131 is mounted on the upright shaft 130 (Figures 1 and 2), which meshes with another wheel 132 and by means of the latter drives the inclined shaft 133, the upper end of which is provided with a bevel wheel 25 (Figure 4ᵃ) for driving the bevel wheel 24 on the stepped roller shaft 8. The other differential wheel 134 is fixed to a spur wheel 135 and serves for winding up the ribbon spring 113. The spur wheel 135 meshes with a pinion 136, which is fixed on the shaft 138 of a worm wheel 137. The worm 139, which co-acts with the said worm wheel 137, is mounted on a shaft 140 and is coupled to the electric motor M by means of a coupling 141, which is preferably resilient. Thus, when driven by the electric motor, the differential wheel 134 is caused to rotate through the gear 139, 137, 138, 136, 135, the differential cross-piece 122 with the planet wheels 123 being caused to rotate and to drive the operating mechanism for the ribbon spring 113, so that the latter is stressed again when required. Through the arrangement of the differential gear the giving off of power by the spring 113 and the supplementing of the tensioning of the spring by the electric motor are independent of each other.

In order to put the electric motor in opeparation when the ribbon spring 113 has been unstressed to a certain extent and to put it out of operation, after the ribbon spring has been wound up, a hammer shaped controlling lever 142 is fixed to the shaft 115 of the ribbon spring 113, which puts a circuit making device into and out of operation (Figures 3b and 3c). On the shaft 143 there is mounted a throw-over lever 144, which, actuated by a spring 145, can only take up one of its extreme positions. This throw-over lever 144 co-acts with the switching lever 146 proper, which is cranked and carries the switch knife 147, which is mounted on its free arm and insulated therefrom. On the insulating piece 148 are mounted two circuit making springs 149 for the switch knife 147, which are insulated from each other and are connected to the current supply wires for the electric motor M. In Figure 3b the automatic circuit making device is shown during the winding up of the ribbon spring 113. During this winding up the switch knife 147 is between the circuit making springs 149 and permits the current for driving the electric motor to pass. When the ribbon spring 113 is being wound up, the controlling lever 142 is moved in the direction of the arrow, as shown in Figure 3b, and a disengaging pin 150 on the said controlling lever 142 presses the throw-over lever 144 downwards until it is thrown into its other extreme position by the spring 145. The switch lever 146, with its switch knife 147, is thereby thrown out of the circuit making position according to Figure 3b and the electric motor 5 is switched out. When, on the other hand, calculations are being made, the ribbon spring 113 runs down and carries along with it the control lever 142 in the opposite direction to that of the arrow (Figure 3b), an engaging pin 151 on the controlling lever 142 catching the throw-over lever 144 from below and raising the latter until the spring 145 throws it into its other extreme position, during which it catches the switch knife lever 146 and again presses the switch knife 147 into the circuit making springs 149. The circuit making device is located in a special compartment of the operating casing 110 and is closed by a cover 152, which can easily be removed, for checking the switching device and cleaning it if necessary.

In the above the subject-matter of the invention has been described, as stated at the commencement, according to construction and operation in the constructional form, according to which stepped rollers are used as digit selecting members. It has already been stated that these digit selecting members can have a different constructional form, while the use of stepped rollers has been mentioned as the preferable form. In Figures 10, 10a, 10b another constructional form of a digit selecting member is shown, the digit selecting member being formed as a disc and provided with stops having preferably the form of teeth, which embody the series of numbers 1–9. With these stops there co-acts a displaceable toothed pinion as the setting wheel, while the stops for embodying the series of numbers 1–9 may be repeated on the face of the said disc, so that a partial rotation of the disc is sufficient for effecting the self-contained movement of the digit selecting member for the purpose of transmitting the numerical value of the depressed key. It may be mentioned in particular as regards the constructional example shown in the diagram, that on a disc 170, stops 176 for embodying the series of numbers 1–9 are arranged in four groups, in which the long stop 177 on the one hand embodies the number 1 and on the other hand acts as the starting point for the remaining embodiment of the figures and thirdly corresponds to the long tooth 34 of the stepped roller (Figure 4d) and therefore fixes the arresting point for the setting pinion 171 each time so that in this case as well an unintentional continued movement and overrunning is avoided. The disc 170 is mounted on a shaft 172, which is preferably provided with locking means 173, 174, whereby for each transmission of a figure a partial rotation of the disc 170, in the present case a quarter rotation, is caused and accurately limited. The setting pinion 171 is slidably mounted on the shaft 175 and can rotate with the latter. This shaft 171 corresponds to the shaft 7 in Figure 4a and the toothed pinion 171 to the setting pinion 6. It is obvious that according to whether the setting pinion 171 is in the top or bottom position according to Figure 10, it will be given a rotary motion in one direction (for addition) or in the other direction (for subtraction), although the disc 170 always rotates in the same direction.

Having now described my invention, what I claim as new and desire to secure by Letters Patent is:—

1. A typewriter calculating machine comprising in combination a frame, a roller carriage slidable thereon, counting mechanism mounted on the roller carriage, a plurality of figure keys, transmission mechanism between the counting mechanism and keys including a shaft operably connected with the counting mechanism, a pair of digit selecting rollers each having stepped teeth representative of the numerals 1 to 9 inclusive for the purpose of addition and subtraction arranged on opposite sides of the shaft and diagonally with respect to each other, an adjustable gear slidably mounted on the shaft and arranged between and adapted to be connected with either of the rollers, an operative connection between the figure keys and the gear for moving the gear into a corresponding numeral selecting position upon depression of one of the keys, driving mechanism for the rollers, and means for controlling the actuation of the driving mechanism and releasable upon depression of the selected figure key.

2. A typewriter calculating machine as claimed in claim 1 wherein the digit selecting member is so formed that after a number has been transmitted it remains in engagement with the adjusting element in the capacity of a locking tooth.

3. A typewriter calculating machine comprising in combination a frame, a roller carriage slidable thereon, counting mechanism mounted on the roller carriage, a plurality of figure keys, transmission mechanism between the counting mechanism and keys, a rotatably mounted shaft operably connected with the transmission mechanism, a rotatably mounted digit selecting roller having steeped teeth representative of the numerals 1 to 9 inclusive, an adjusting gear slidably mounted on the shaft and associated with the roller, a slidably mounted rack bar operatively connected with the adjusting gear, a substantially vertically slidable and rotatably mounted shaft, a gear on the upper end of the substantially vertically shaft meshing with the rack bar so that upon rotation of the shaft the adjusting gear will be adjusted with respect to the digit selecting roller, a plurality of pivotally mounted double-armed levers arranged beneath the figure keys and adapted to be operated upon the depression of the keys, a slidably mounted comb device engageable by the double-armed levers, another rack bar slidable with the comb device and another gear on the lower end of the substantially vertical shaft and engageable by the rack bar which is carried with the comb device for effecting setting of the adjusting gear corresponding to the numerical values struck by the keys, driving mechanism for the digit selecting roller and means for controlling the actuation of the driving mechanism releasable upon the depression of the selected figure key.

4. A typewriter calculating machine in accordance with claim 3 wherein auxiliary key rods are provided for actuating the comb device to permit calculating without inscribing.

5. A typewriter calculating machine in accordance with claim 3 wherein a single shaft is provided for supporting all of the double-armed levers and wherein manually operable means is mounted in the frame and on the shaft for maintaining the double-armed levers out of the path of movement of the key levers for the purpose of permitting inscribing without calculating.

6. A typewriter calculating machine in accordance with claim 3 wherein resilient means in the form of a spring is connected with the comb device for maintaining the same in its intermediate position so that movement of the comb device in either direction is reduced to a minimum in order to save time when the numbers are to be set up.

7. A typewriter calculating machine in accordance with claim 3 wherein means is provided for releasing the means for controlling the actuation of the driving mechanism of the digit selecting roller and includes a switch lever operatively associated with one of the double-armed levers and engages beneath the gear on the lower end of the substantially vertical shaft for lifting the shaft to effect a disconnecting action.

8. A typewriter calculating machine in accordance with claim 3, wherein a securing device is employed for holding the adjusting gear in a set position during the rotation of the stepped roller, said device including a plurality of locking teeth on the inner face of the rack bar, and a notched disc which is rotatable with the digit selecting roller for coacting with the locking teeth.

9. A typewriter calculating machine as claimed in claim 3 wherein two digit selecting rollers are employed and wherein oppositely rotatable shafts are provided for supporting the rollers, the driving mechanism being connected with one of the shafts, means for connecting the shafts together, another rotatably mounted shaft in proximity to the roller supporting shafts, the means for controlling the actuation of the driving mechanism being supported on the said last mentioned and roller supporting shafts and the last mentioned shaft being releasable upon the depression of the selected figure key, substantially as and for the purposes set forth.

10. A typewriter calculating machine in accordance with claim 3 in which two digit selecting members are employed and in which the members are arranged so that they can only carry out their movements when the counting mechanism is in engagement with its transmission mechanism and at other times are secured in their initial positions against movements, substantially as and for the purposes set forth.

11. A typewriter calculating machine in accordance with claim 1 wherein a rotatably mounted release shaft is employed and controlled in its movement by the controlling mechanism of the driving means of the digit selecting roller, a pin on the release shaft for disconnecting the counting mechanism from the shaft which is operably connected therewith and a coupling between the release shaft and the counting mechanism so that on continued movement of the counting mechanism the release shaft will be carried along therewith by reason of the engagement of the release pin with the walls of the counting mechanism.

12. A typewriter calculating machine in accordance with claim 3 wherein a rotatably mounted shaft is associated with the substantially vertically slidable shaft and connected therewith so that upon the sliding of the substantially vertical sliding shaft the movement effects release of the controlling mechanism for the driving mechanism and wherein the controlling mechanism includes coacting resilient and rigid projections for locking and releasing the digit selecting roller supporting shafts.

In testimony whereof I have signed my name to this specification.

THEODOR EUGEN BUSCHMANN.

Witnesses:
MAX ALBRECHT HOFMANN,
ARTHUR EUGEN PFEIFER.